US010369839B2

(12) United States Patent
Deng

(10) Patent No.: US 10,369,839 B2
(45) Date of Patent: Aug. 6, 2019

(54) OMNIDIRECTIONAL WHEELS AND ASSOCIATED WHEEL GUARDS

(71) Applicant: Facebook, Inc., Menlo Park, CA (US)

(72) Inventor: Eric Deng, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 224 days.

(21) Appl. No.: 15/431,745

(22) Filed: Feb. 13, 2017

(65) Prior Publication Data

US 2018/0229547 A1    Aug. 16, 2018

(51) Int. Cl.
*B60B 19/00* (2006.01)
*B60B 19/12* (2006.01)

(52) U.S. Cl.
CPC ............ *B60B 19/003* (2013.01); *B60B 19/12* (2013.01); *B60B 2900/351* (2013.01); *B60B 2900/551* (2013.01)

(58) Field of Classification Search
CPC ......... B60B 19/003; B60B 19/12; B60B 3/08; B60B 2900/551; B60B 2900/351
USPC ........................................................ 301/5.23
See application file for complete search history.

(56) References Cited

U.S. PATENT DOCUMENTS

| | | | |
|---|---|---|---|
| 2,698,454 A | 1/1955 | Meyer et al. | |
| 4,981,203 A * | 1/1991 | Kornylak | B65G 13/10 193/35 MD |
| 5,170,528 A | 12/1992 | Navar et al. | |
| 5,339,350 A | 8/1994 | Thelosen et al. | |
| 5,524,916 A | 6/1996 | Redens et al. | |
| 6,625,846 B2 | 9/2003 | Takizawa | |
| 6,678,917 B1 | 1/2004 | Miller et al. | |
| 7,641,288 B1 * | 1/2010 | Baker | B60B 19/003 16/45 |
| 8,191,289 B2 | 6/2012 | Raftery | |
| 8,556,279 B2 * | 10/2013 | McKinnon | B62B 1/10 280/47.27 |
| 9,168,786 B2 * | 10/2015 | Schlee | B60B 39/00 |
| 9,566,926 B1 * | 2/2017 | Dubas | B60R 19/54 |
| 10,093,368 B2 * | 10/2018 | Black | B60P 3/075 |

(Continued)

OTHER PUBLICATIONS

Advisory Action dated Dec. 29, 2017 for U.S. Appl. No. 15/431,735 for Deng, E. et al. filed Feb. 13, 2017.

(Continued)

*Primary Examiner* — S. Joseph Morano
*Assistant Examiner* — Jean W Charleston
(74) *Attorney, Agent, or Firm* — FisherBroyles, LLP

(57) ABSTRACT

Technology is provided for omnidirectional wheels having rolling surfaces configured to roll over obstacles when the wheel is moving sideways with respect to its axis of rotation. The omnidirectional wheel can include a central disk assembly and a pair of lateral disk assemblies coaxially positioned on opposite sides of the central disk assembly. The central disk assembly can include a central carrier plate having a first diameter and a plurality of central rollers each rotatably coupled to a circumferential margin of the central carrier plate for rotation about a first roller axis oriented orthogonal to an axis of the wheel. Each lateral disk assembly can include a lateral carrier plate having a second diameter smaller than the first diameter and a plurality of lateral rollers each rotatably coupled to a circumferential margin of the lateral carrier plate for rotation about a second roller axis oriented orthogonal to the wheel axis.

9 Claims, 9 Drawing Sheets

(56) References Cited

U.S. PATENT DOCUMENTS

| | | | | |
|---|---|---|---|---|
| 2007/0096541 A1* | 5/2007 | Guile | ............... | B60B 19/003 |
| | | | | 301/5.23 |
| 2010/0038960 A1* | 2/2010 | Takenaka | ............ | B60B 19/00 |
| | | | | 305/133 |
| 2014/0232174 A1* | 8/2014 | Zdrahal | ............... | B60B 11/02 |
| | | | | 301/5.23 |

OTHER PUBLICATIONS

Final Office Action dated Nov. 20, 2017 for U.S. Appl. No. 15/431,735 for Deng, E. et al. filed Feb. 13, 2017.
Non-Final Office Action dated Aug. 4, 2017 for U.S. Appl. No. 15/431,735 for Deng, E. et al. filed Feb. 13, 2017.
U.S. Appl. No. 15/431,735 by Deng, E., et al., filed Feb. 13, 2017.

* cited by examiner

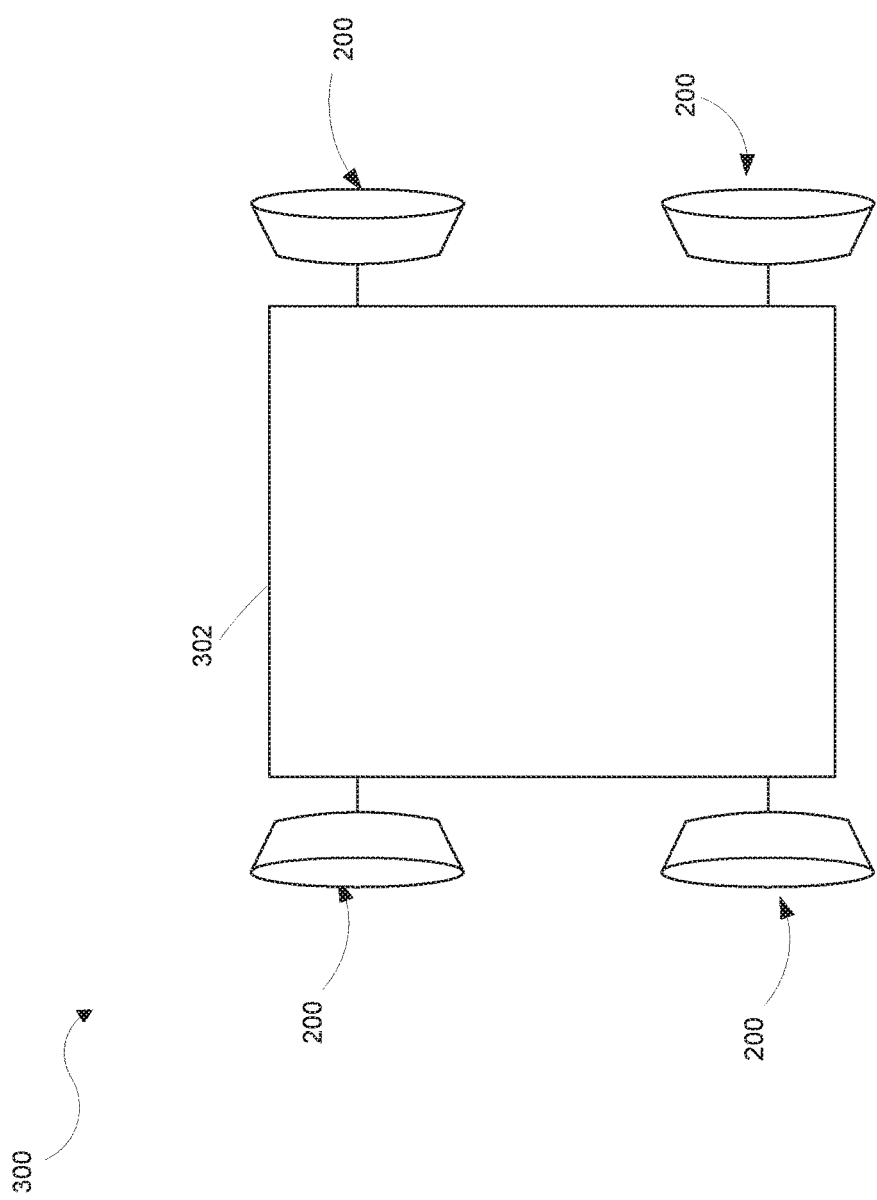

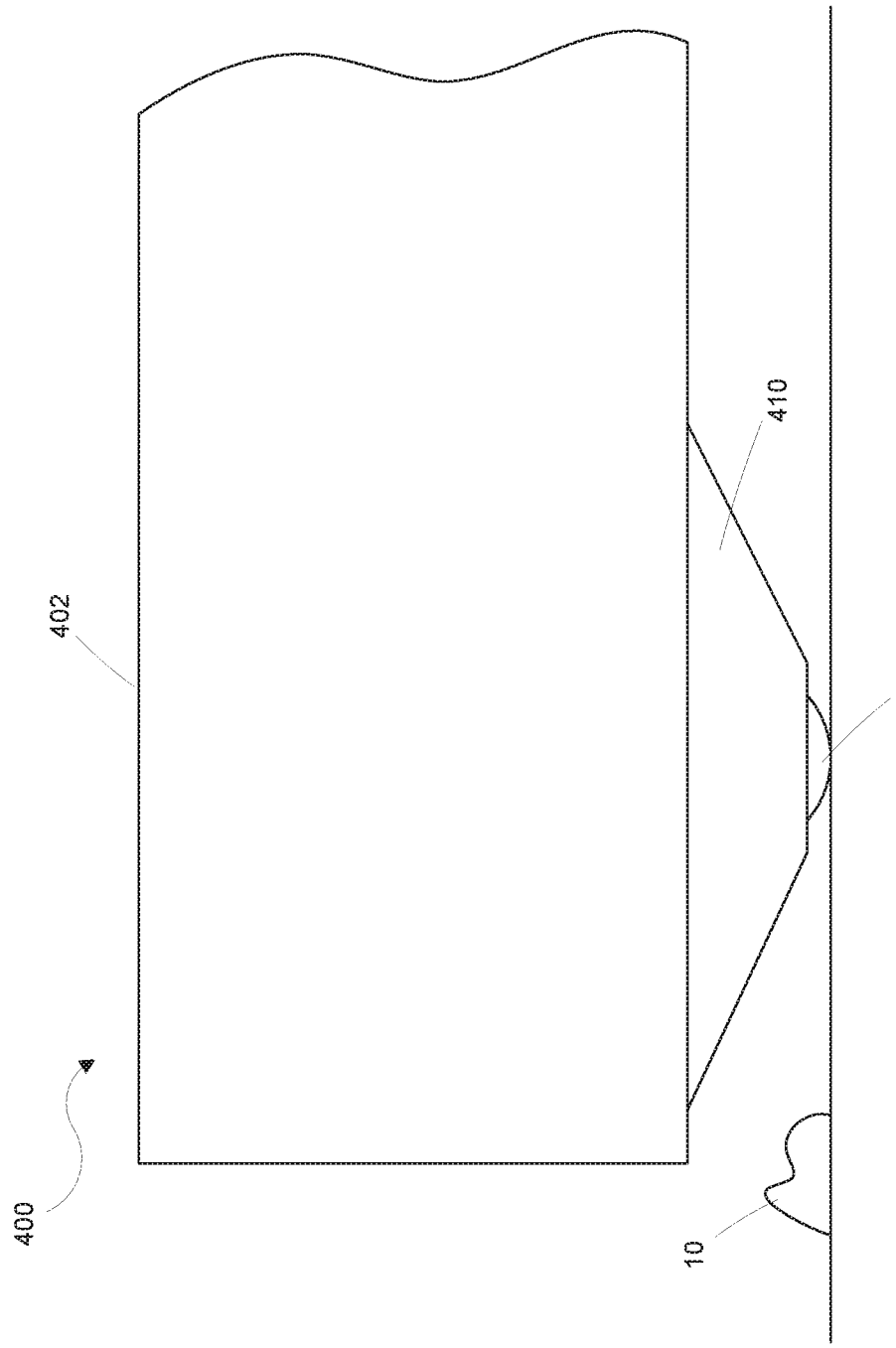

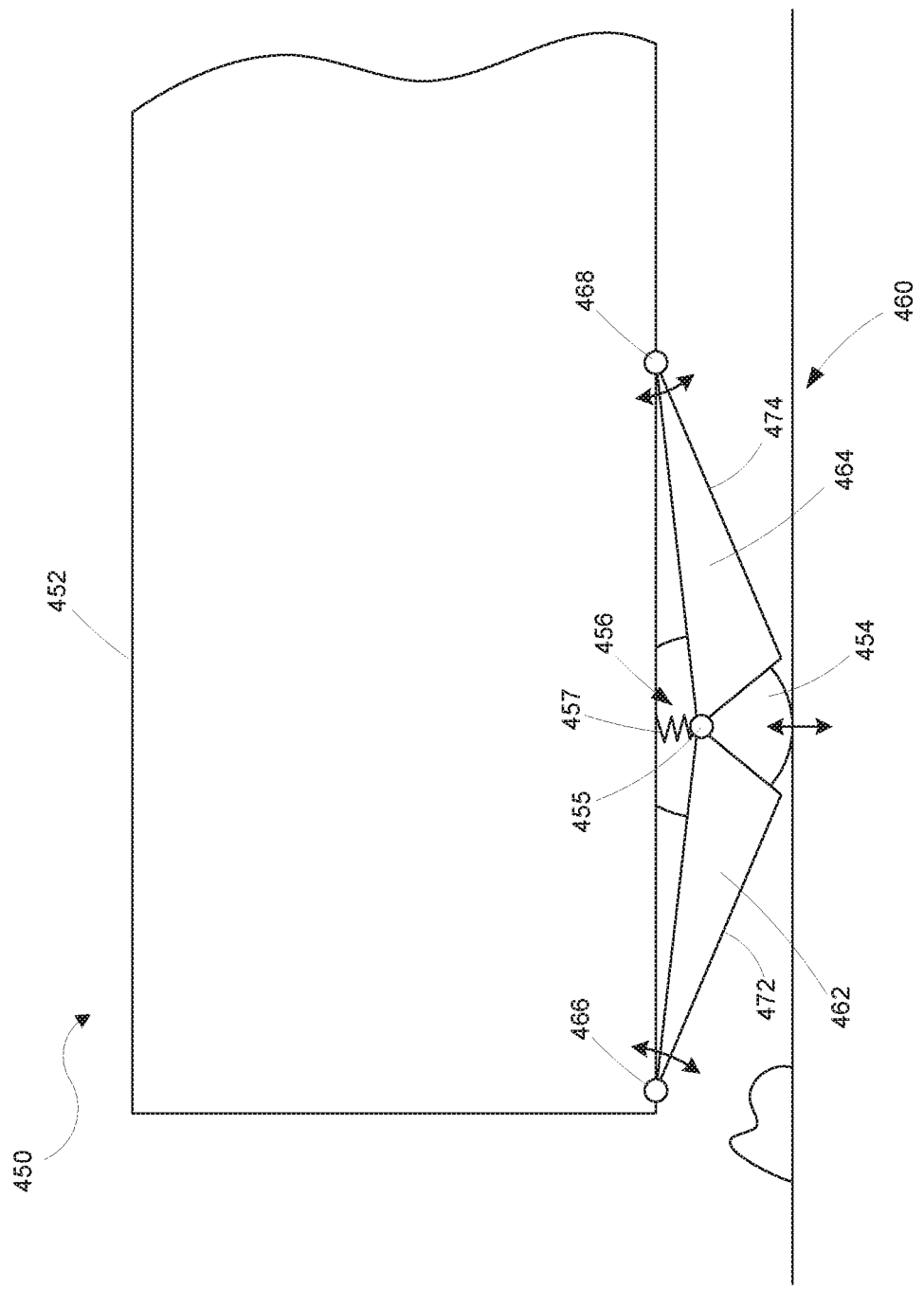

OMNIDIRECTIONAL WHEELS AND ASSOCIATED WHEEL GUARDS

TECHNICAL FIELD

This patent application is directed to wheels for use in holonomic drivetrains and, more specifically, to omnidirectional wheels and associated wheel guards.

BACKGROUND

A holonomic drivetrain moves with three degrees of freedom which can provide enhanced maneuverability for various wheeled vehicle applications, particularly robotic applications. Holonomic drivetrains typically use omnidirectional wheels, including mecanum wheels, which facilitate shifting the vehicle from side to side or strafing diagonally without changing the direction of its wheels. While these maneuvers can provide advantages from a maneuverability perspective, they can have problems negotiating bumps when the wheels move parallel to their axis of rotation and the sides of the wheels can catch on steps and other surface discontinuities.

BRIEF DESCRIPTION OF THE DRAWINGS

Embodiments of the omnidirectional wheels and associated wheel guards described herein may be better understood by referring to the following Detailed Description in conjunction with the accompanying drawings, in which like reference numerals indicate identical or functionally similar elements:

FIG. 5 is a diagrammatic top view of a wheeled vehicle incorporating the mecanum wheel shown in FIGS. 3-4B.

FIG. 8 is a diagrammatic side view of a wheel guard according to a representative embodiment of the present technology.

FIG. 10 is a diagrammatic side view of a wheel guard assembly according to another representative embodiment.

Figures 1, 2:
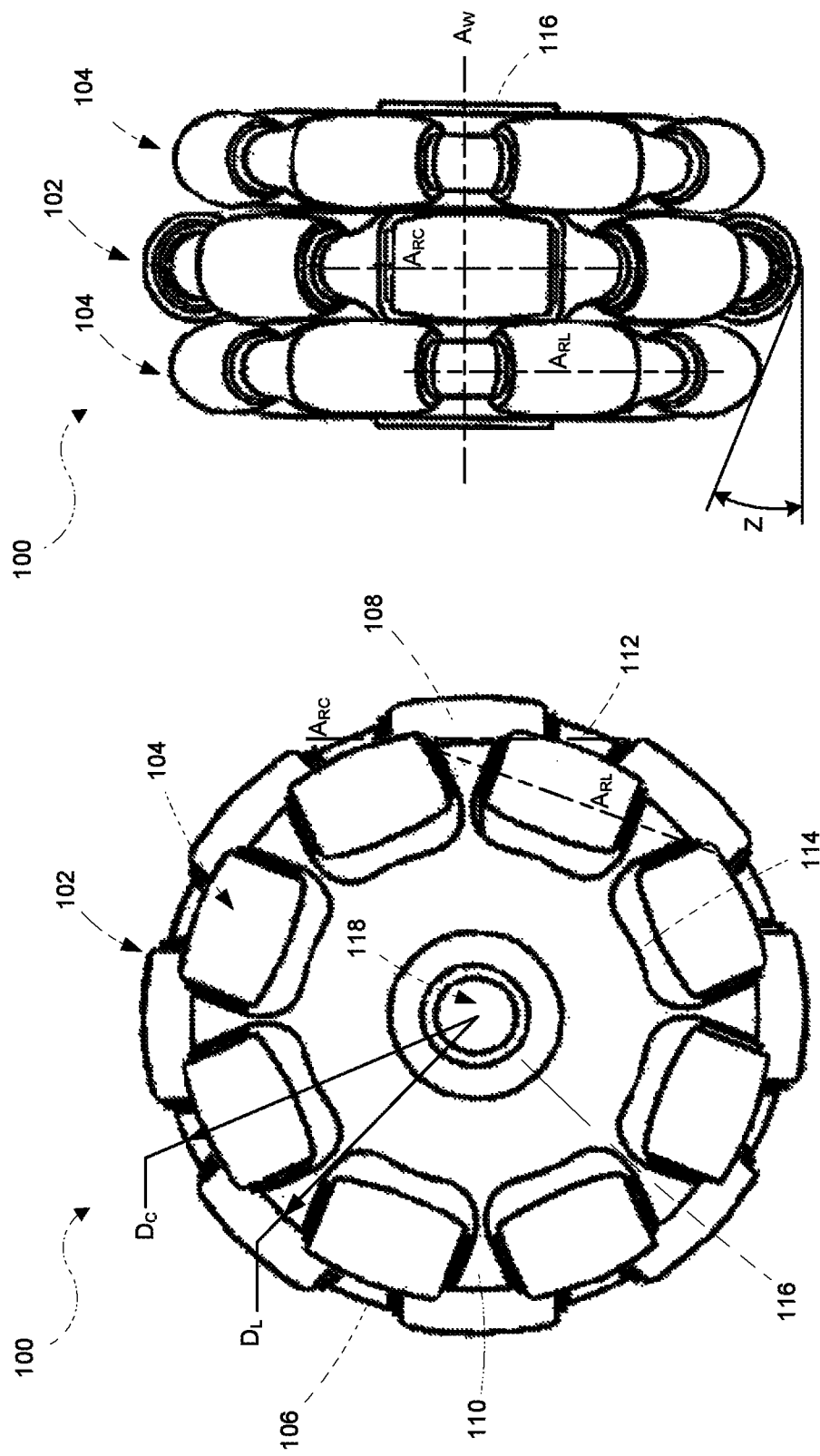
FIG. 1 is a side view in elevation of an omnidirectional wheel according to a representative embodiment of the present technology.
FIG. 2 is a front view of the omnidirectional wheel shown in FIG. 1.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, equivalents, and alternatives falling within the scope of the embodiments as defined by the appended claims.

DETAILED DESCRIPTION

Overview

Technology is provided for omnidirectional wheels having rolling surfaces configured to roll over obstacles when the wheel is moving parallel with respect to its axis of rotation. In a representative embodiment, an omnidirectional wheel can comprise a central disk assembly and a pair of lateral disk assemblies coaxially positioned on opposite sides of the central disk assembly. The central disk assembly can include a central carrier plate having a first diameter and a plurality of central rollers each rotatably coupled to a circumferential margin of the central carrier plate for rotation about a first roller axis oriented orthogonal to an axis of the wheel. Each lateral disk assembly can include a lateral carrier plate having a second diameter smaller than the first diameter and a plurality of lateral rollers each rotatably coupled to a circumferential margin of the lateral carrier plate for rotation about a second roller axis oriented orthogonal to the wheel axis. The smaller diameter of the lateral carrier plates allows the disclosed wheels to more easily roll over obstacles.

Technology is also provided for mecanum wheels having tapered rolling surfaces which can provide advantages over conventional straight mecanum wheels. The disclosed tapered mecanum wheels can be mounted with negative camber to lower the center of gravity of a wheeled vehicle, such as a robot, or they can be mounted with positive camber to increase the clearance of the vehicle. In a representative embodiment, a mecanum wheel can comprise a first hub disk having a first diameter and a plurality of first roller mounts disposed around a circumferential margin of the first hub disk and a second hub disk having a second diameter smaller than the first diameter and a plurality of second roller mounts disposed around a circumferential margin of the second hub disk. A plurality of rollers each extends between corresponding circumferentially offset first and second roller mounts, whereby each of the plurality of rollers is mounted for rotation about a corresponding roller axis oriented at a compound angle with respect to the wheel axis.

Technology is provided for wheel guards that can help lift the wheel of a wheeled vehicle, such as a robot, up and over an obstacle (e.g., a bump or step). In an embodiment, a wheel guard can comprise a guard body having a base portion mountable to a chassis of the wheeled vehicle. A wheel opening can be centrally located in the guard body and configured to receive a wheel of the wheeled vehicle therethrough. One or more ramped surfaces can extend from the base portion to the wheel opening. In some embodiments, the ramped surfaces extend arcuately between the base portion and the opening.

In another embodiment, a wheel guard assembly can comprise a guard member including a ramped surface extending between a first end portion and a second end portion, the second end portion coupleable to a suspension of a wheel of the wheeled vehicle. A pivot mechanism is attached to the first end portion that is coupleable to a chassis of the wheeled vehicle, whereby the guard member can pivot with respect to the chassis as the wheel moves up and down.

General Description

Various examples of the devices introduced above will now be described in further detail. The following description provides specific details for a thorough understanding of and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIGS. 1 and 2 illustrate an omnidirectional wheel 100 according to a representative embodiment of the present technology. The omnidirectional wheel 100 is mountable for rotation about a wheel axis $A_W$. In some embodiments, the wheel 100 includes a central disk assembly 102 and a pair of lateral disk assemblies 104 coaxially positioned on opposite sides of the central disk assembly 102.

The central disk assembly 102 includes a central carrier plate 106 having a central (e.g., first) diameter $D_C$. A plurality of central rollers 108 are rotatably coupled to a circumferential margin of the central carrier plate 106 for rotation about a first roller axis $A_{RC}$ oriented orthogonal to the wheel axis $A_W$. Each lateral disk assembly 104 includes a lateral carrier plate 110 having a lateral (e.g., second) diameter $D_L$ smaller than the central diameter $D_C$. In some embodiments, the lateral diameters $D_L$ of the lateral carrier plates 110 can be equal, or can be different from each other. A plurality of lateral rollers 112 are each rotatably coupled to a circumferential margin of the lateral carrier plate 110 for rotation about a second roller axis $A_{RL}$ oriented orthogonal to the wheel axis $A_W$. With reference to FIG. 2, it can be understood that the smaller diameter of the lateral carrier plates 106 provides an approach angle Z that allows the wheel 100 to roll over obstacles when the wheel is traveling in a lateral direction generally parallel to the wheel axis $A_W$.

In some embodiments, the circumferential margins of the central and lateral carrier plates 106 and 110, respectively, each include a plurality of notches configured to receive a corresponding roller. For example, the lateral carrier plates 110 each includes a plurality of notches 114, each of which corresponds to an associated lateral roller 112.

In some embodiments, the wheel 100 further comprises a hub 116, wherein the pair of lateral carrier plates 110 and the central carrier plate 106 are attached to the hub 116. In some embodiments, the hub 116 can include an axle bore 118 extending along the wheel axis $A_W$.

In some embodiments, the lateral rollers 112 are circumferentially offset from the central rollers 108 as shown in the figures. In other words, the central rollers 108 and the lateral rollers 112 are interlaced with each other. In some embodiments, the lateral rollers 112 and the central rollers 108 each have approximately the same roller diameter. However, in other embodiments the rollers can have differing sizes.

In at least one representative embodiment, the central carrier plate 106, the lateral carrier plates 110, and the hub 116 can comprise a single unitary hub. The unitary hub can have a central disk portion (e.g., 106) with a central diameter and first and second lateral disk portions (e.g., 110) having first and second diameters smaller than the central diameter. In some embodiments, the first and second diameters of the lateral disk portions can be equal, or can be different from each other.

Although the omnidirectional wheel 100 is illustrated and described herein as including a central disk assembly 102 with two lateral disk assemblies 104 having smaller diameters, more or fewer disk assemblies having various diameters may be used together in various combinations without deviating from the scope of the present technology.

Figure 3:
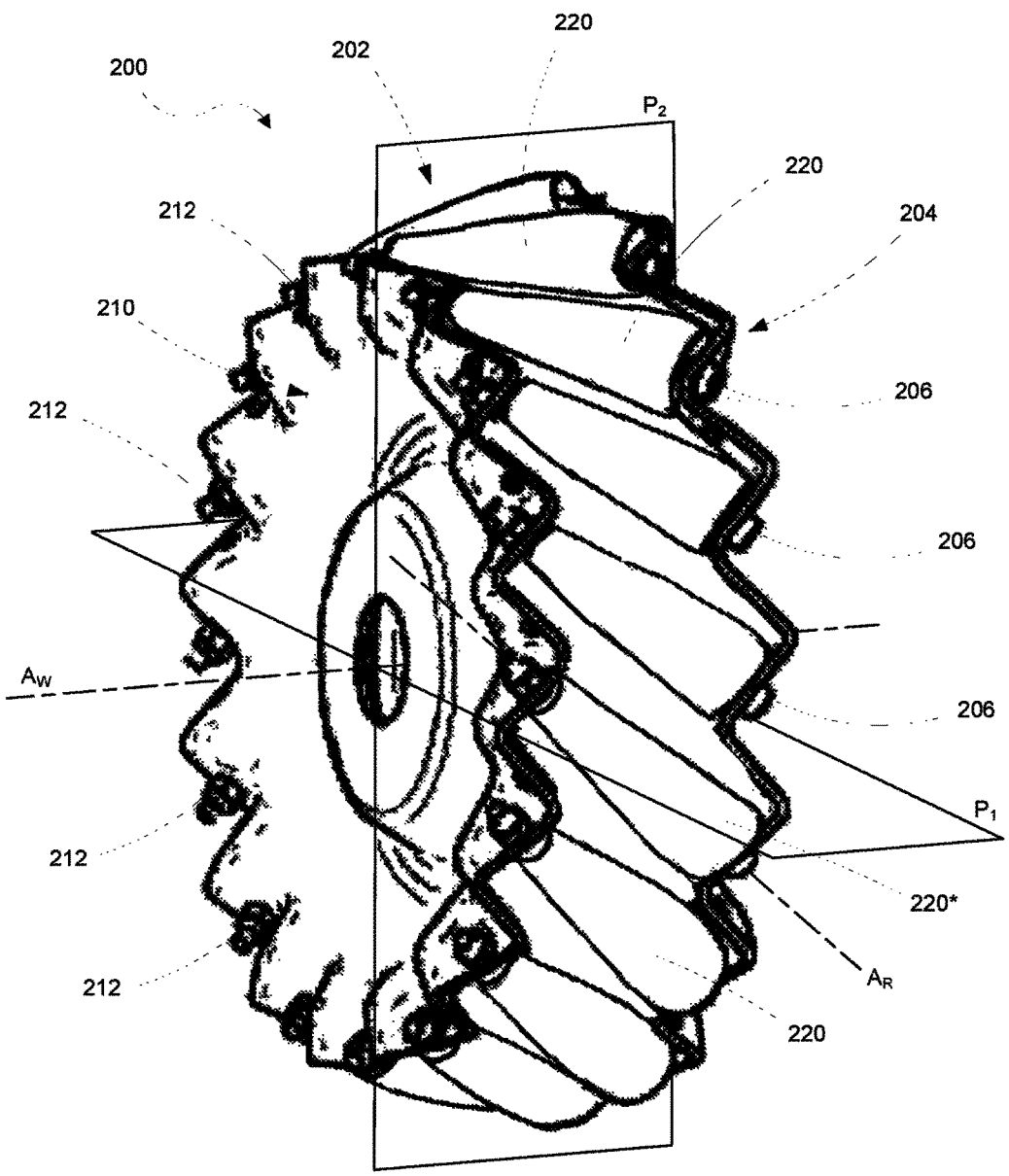
FIG. 3 is an isometric view of a tapered mecanum wheel according to a representative embodiment of the present technology.

FIG. 3 illustrates a tapered mecanum wheel 200 according to a representative embodiment of the present technology. The mecanum wheel 200 has a tapered rolling surface 202 which can provide advantages over conventional straight mecanum wheels as described more fully below. The mecanum wheel 200 is mountable for rotation about a wheel axis $A_W$. The mecanum wheel 200 can include a first hub disk 204 having a first diameter $D_1$ (FIG. 4A) and a plurality of first roller mounts 206 disposed around a circumferential margin of the first hub disk 204. A second hub disk 210 having a second diameter $D_2$ (FIG. 4A) smaller than the first diameter $D_1$ is axially offset from the first hub disk 204. A plurality of second roller mounts 212 are disposed around a circumferential margin of the second hub disk 210.

Figure 4A:
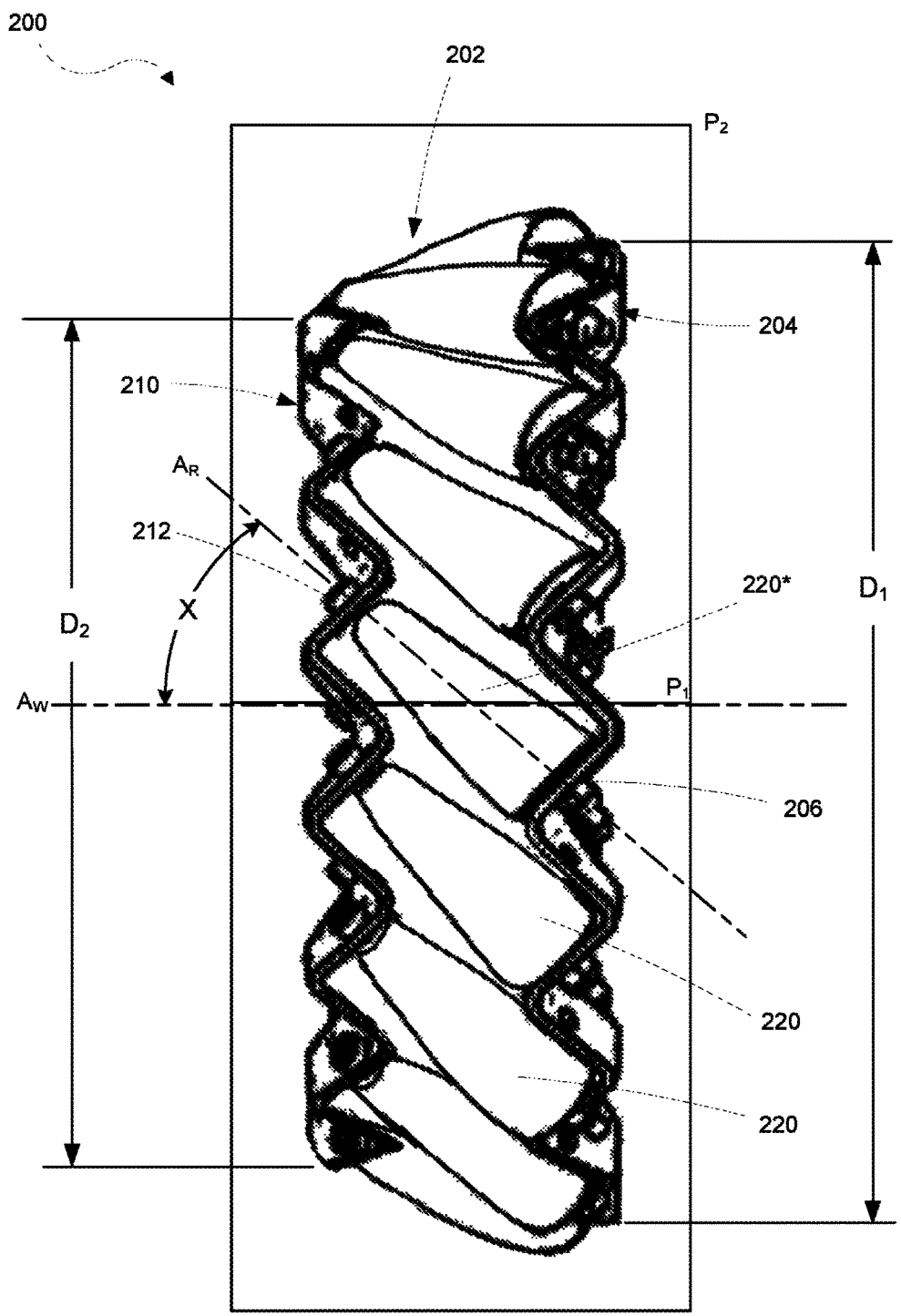
FIG. 4A is a side view of the mecanum wheel shown in FIG. 3.
Figure 4B:
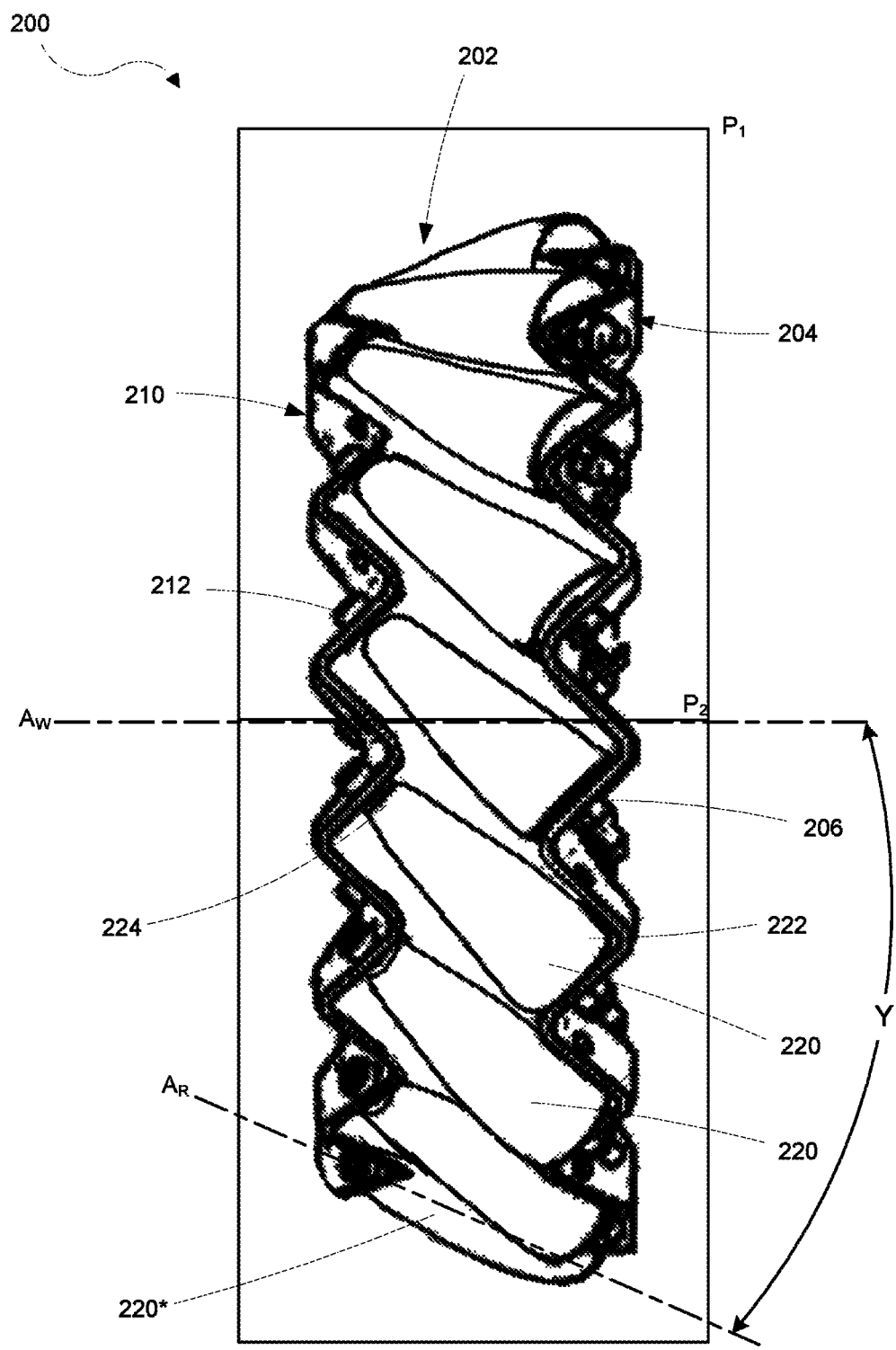
FIG. 4B is a top view of the mecanum wheel shown in FIG. 4A.

A plurality of rollers 220 each extend between corresponding circumferentially offset first and second roller mounts 206 and 212. The roller 220*, for example, is mounted for rotation about a roller axis $A_R$ oriented at an angle with respect to both planes $P_1$ and $P_2$, which intersect orthogonally along the wheel axis $A_W$. As shown in FIG. 4A (side view), the roller axis $A_R$ is oriented at an angle X with respect to plane $P_1$. As shown in FIG. 4B (top view), the roller axis $A_R$ is also oriented at an angle Y with respect to plane $P_2$. Therefore, each of the plurality of rollers 220 is mounted for rotation about a corresponding roller axis $A_R$ oriented at a compound angle with respect to the wheel axis $A_W$. In contrast, a conventional mecanum wheel has a flat rolling surface. Accordingly, the roller axis of a conventional mecanum wheel would be oriented at an angle with respect to only plane $P_1$ and it would be parallel to plane $P_2$. Thus, in a conventional mecanum wheel, angle Y is zero.

In some embodiments, angles X and Y can be approximately 45 degrees, for example. As shown in FIG. 4B, in some embodiments, each of the plurality of rollers 220 can be tapered from a large end 222 (coupled to a corresponding one of the first roller mounts 206) to a small end 224 (coupled to a corresponding one of the second roller mounts 212).

Figure 7:
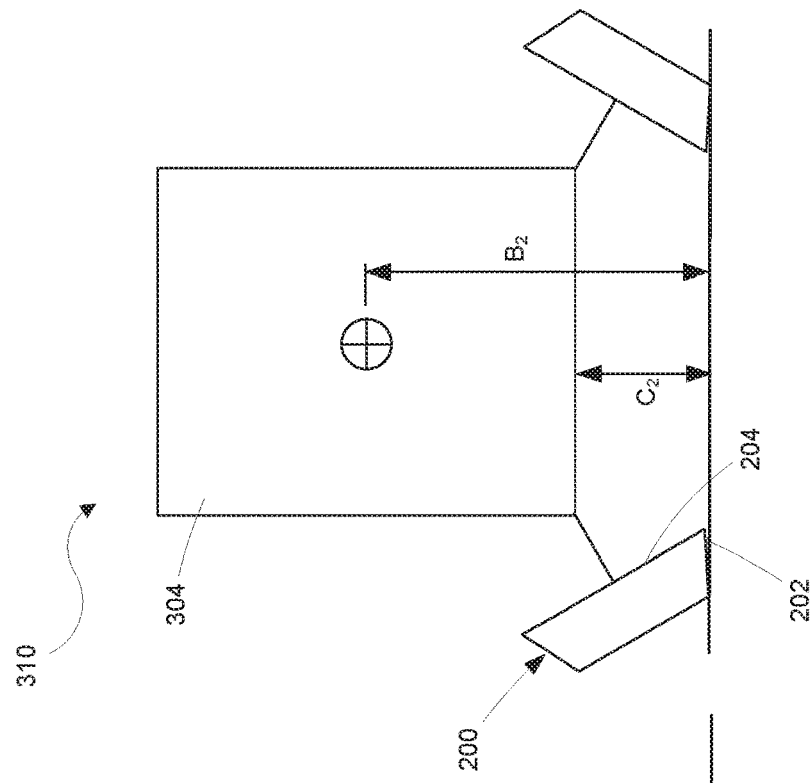
FIG. 7 is a diagrammatic front view of a wheeled vehicle illustrating an alternative wheel mounting arrangement.
Figure 6:
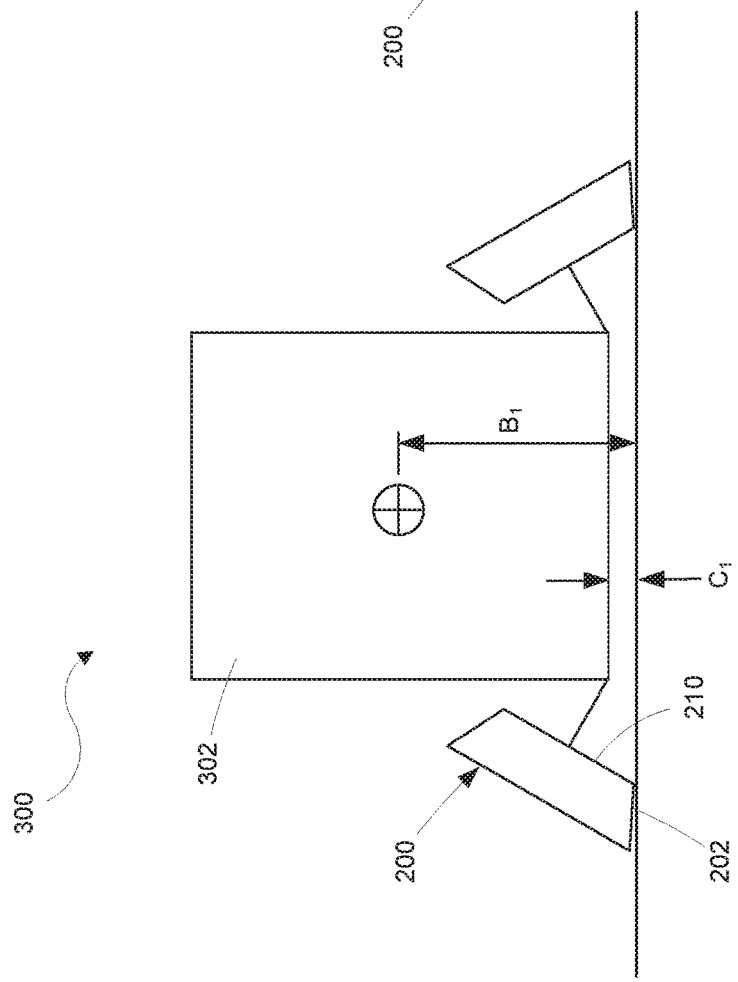
FIG. 6 is a diagrammatic front view of the wheeled vehicle shown in FIG. 5.

FIG. 5 represents a wheeled vehicle (e.g., a robot) 300 with a mecanum wheel 200, as described above, positioned at each corner of the robot's chassis 302. When viewed from the front, as in FIG. 6, the wheels 200 are mounted on the chassis 302 with their rolling surfaces 202 level with the ground and their smaller diameter hub 210 facing the chassis 302. Thus, the wheels 200 have negative camber with respect to the chassis 302. This wheel arrangement provides the advantage of reducing the distance $B_1$ between the robot's center of gravity and the ground, but with less ground clearance $C_1$. In an alternative arrangement, as shown in FIG. 7, a robot 310 includes wheels 200 mounted on a chassis 304 with the their rolling surfaces 202 level with the ground and their larger diameter hub 204 facing the chassis 304. Thus, the wheels 200 have positive camber with respect to the chassis 304. This wheel arrangement provides the advantage of increasing the ground clearance $C_2$, but with an increased distance $B_2$ between the robot's center of gravity and the ground. Depending on the application, the wheels 200 can be oriented with either positive or negative camber to increase the robot's ground clearance or lower the robot's center of gravity.

Figure 9:
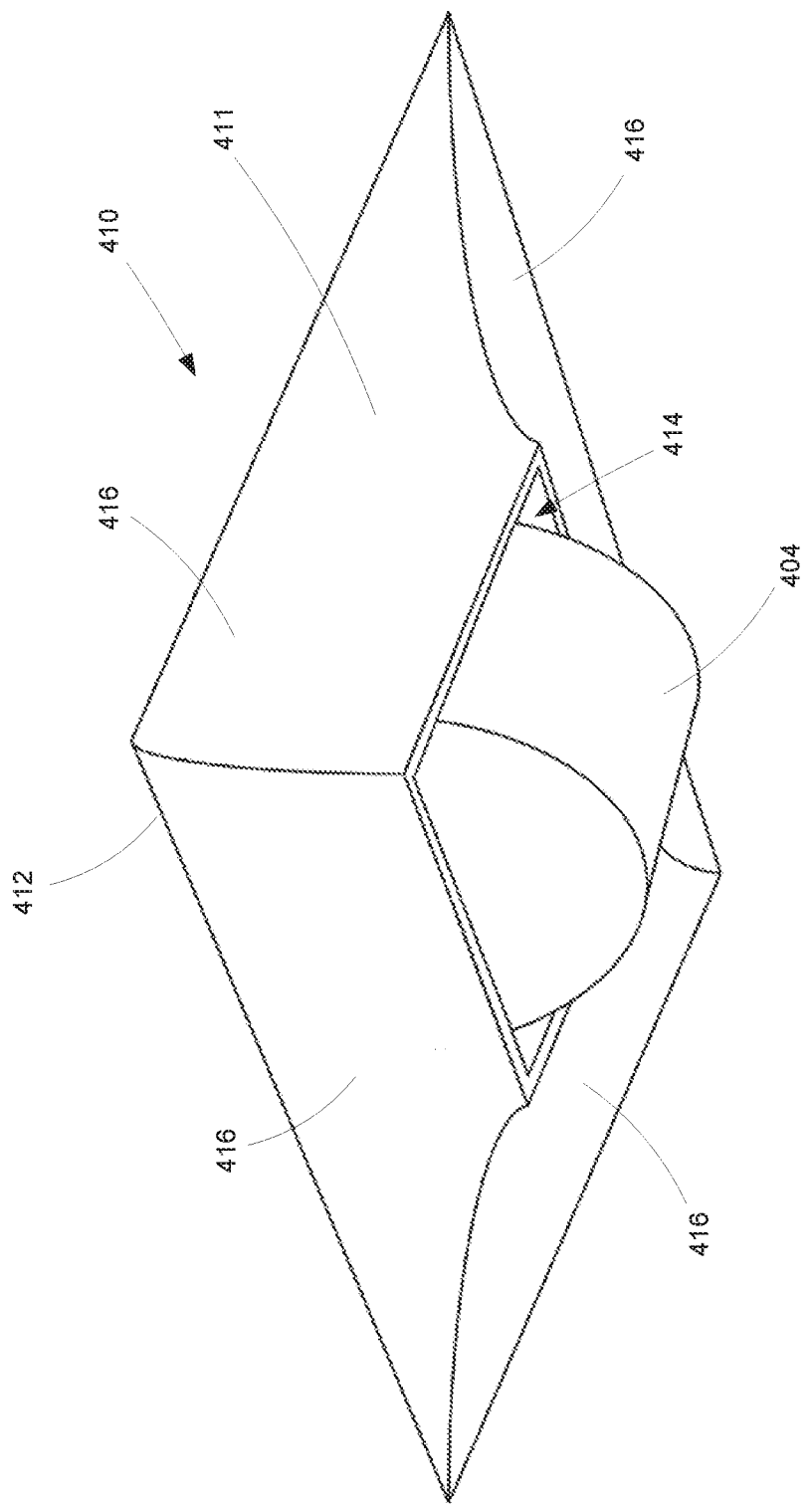
FIG. 9 is an isometric view of the wheel guard shown in FIG. 8.

FIG. 8 illustrates a wheel guard 410 according to a representative embodiment of the present technology. The wheel guard 410 is disposed on the bottom or underside of a wheeled vehicle, such as a robot 400 around one of its wheels 404. The wheel guard 410 attaches to the robot's chassis 402 and can help lift the robot 400, up and over an obstacle 10 (e.g., a bump or step). As shown in FIG. 9, the wheel guard 410 includes a guard body 411 having a base portion 412 mountable to the underside of a chassis 402 of the wheeled vehicle 400 (FIG. 8) and a wheel opening 414 centrally located in the guard body 411. The wheel opening 414 is configured to receive the wheel 404 therethrough. One or more ramped surfaces 416 can extend from the base portion 412 to the wheel opening 414. In some embodiments, the wheel opening 414 can be square or rectangular, for example. In some embodiments the base portion 412 can also be square or rectangular such that the guard body 411 is in the form of a frustum. In other embodiments, the base portion 412 can be circular. In some embodiments, the one or more ramped surfaces 416 can extend arcuately from the base portion 412 to the wheel opening 414 as shown in FIG. 9. In some embodiments, the guard body includes at least one ramped surface facing the direction of the wheel's axis of rotation. In other embodiments, the guard body includes at least one ramped surface facing transverse to the direction of the wheel's axis of rotation. In at least one representative embodiment, the guard body can include a pair of oppositely facing ramped surfaces, each facing the direction of the wheel's axis of rotation.

FIG. 10 illustrates a wheel guard assembly 460 according to another representative embodiment. The wheel guard assembly 460 can include two guard members 462 and 464, each having a ramped surface 472 and 474, respectively. The guard members each extend between a first end portion and a second end portion. The second end portion of each guard member is coupleable to a suspension 456 of a corresponding wheel 454. The pivot mechanisms 466 and 468 (e.g., hinges) are attached to the first end portions of the guard members 462 and 464, respectively. The pivot mechanisms 466 and 468 are coupleable to the chassis 452 of the wheeled vehicle 450. Accordingly, the guard members 462 and 464 can pivot with respect to the chassis 452 as the wheel 454 moves up and down. In some embodiments, the suspension 456 includes an axle 455 and a spring 457 connecting the axle 455 to the chassis 452. In some embodiments, the second end portions can be coupled to the axle 455. As shown in FIG. 10, the guard members 462 and 464 pivot about pivot axes (e.g., pivot mechanisms 466 and 468) substantially parallel with the axis (e.g., axle 455) of the wheel 454.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A mecanum wheel mountable for rotation about a wheel axis, comprising:
    a first hub disk having a first diameter and a plurality of first roller mounts disposed around a circumferential margin of the first hub disk;
    a second hub disk having a second diameter smaller than the first diameter and a plurality of second roller mounts disposed around a circumferential margin of the second hub disk; and
    a plurality of rollers each extending between corresponding circumferentially offset first and second roller mounts, whereby each of the plurality of rollers is mounted for rotation about a corresponding roller axis oriented at a compound angle with respect to the wheel axis.

2. The mecanum wheel of claim 1, wherein each of the plurality of rollers is tapered from a large end coupled to a corresponding one of the first roller mounts to a small end coupled to a corresponding one of the second roller mounts.

3. The mecanum wheel of claim 1, wherein, for each of the plurality of rollers:
    the corresponding roller axis is oriented at a first angle relative to a first plane that includes the wheel axis; and
    the corresponding roller axis is oriented at a second angle relative to a second plane that includes the wheel axis and is orthogonal to the first plane.

4. The mecanum wheel of claim 3, wherein the first angle is 45 degrees.

5. The mecanum wheel of claim 3, wherein the second angle is 45 degrees.

6. A wheeled vehicle comprising:
    a chassis; and
    a plurality of mecanum wheels rotatably coupled to the chassis, wherein each of the plurality of mecanum wheels rotates about a corresponding wheel axis, and wherein each of the plurality of mecanum wheels comprises:

a first hub disk having a first diameter and a plurality of first roller mounts disposed around a circumferential margin of the first hub disk;

a second hub disk having a second diameter smaller than the first diameter and a plurality of second roller mounts disposed around a circumferential margin of the second hub disk; and a plurality of rollers each extending between corresponding circumferentially offset first and second roller mounts, whereby each of the plurality of rollers is mounted for rotation about a corresponding roller axis oriented at a compound angle with respect to the corresponding wheel axis.

7. The wheeled vehicle of claim 6, wherein, for each of the plurality of mecanum wheels, the wheel axis of the corresponding mecanum wheel is oriented relative to the chassis such that a rolling surface of the corresponding mecanum wheel is level with a ground surface.

8. The wheeled vehicle of claim 7, wherein, for at least one of the plurality of mecanum wheels, the second hub disk of the corresponding mecanum wheel faces the chassis such that the corresponding mecanum wheel possesses negative camber with respect to the chassis.

9. The wheeled vehicle of claim 7, wherein, for at least one of the plurality of mecanum wheels, the first hub disk of the corresponding mecanum wheel faces the chassis such that the corresponding mecanum wheel possesses positive camber with respect to the chassis.

* * * * *